(12) United States Patent
Zheng

(10) Patent No.: US 11,328,636 B2
(45) Date of Patent: May 10, 2022

(54) CLAMPER AND LIGHTING FIXTURE

(71) Applicant: WUHAN CHINA STAR OPTOELECTRONICS TECHNOLOGY CO., LTD., Hubei (CN)

(72) Inventor: Junfeng Zheng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 178 days.

(21) Appl. No.: 16/466,042

(22) PCT Filed: Nov. 1, 2018

(86) PCT No.: PCT/CN2018/113260
§ 371 (c)(1),
(2) Date: Jun. 3, 2019

(87) PCT Pub. No.: WO2020/062412
PCT Pub. Date: Apr. 2, 2020

(65) Prior Publication Data
US 2020/0312204 A1    Oct. 1, 2020

(30) Foreign Application Priority Data
Sep. 29, 2018   (CN) .......................... 201811150654.7

(51) Int. Cl.
*G09G 3/00*    (2006.01)

(52) U.S. Cl.
CPC .................................... *G09G 3/006* (2013.01)

(58) Field of Classification Search
CPC ........ G09G 3/006; G09G 3/00; G09G 3/3406; G09G 2300/0426; G02F 1/1303; G02F 1/1309; G02B 6/0086; G02B 6/0093
See application file for complete search history.

(56) References Cited

U.S. PATENT DOCUMENTS

| 2008/0035173 A1* | 2/2008 | Tuman | B29C 48/08 |
| | | | 134/9 |
| 2008/0245483 A1* | 10/2008 | Toyoshima | B32B 43/006 |
| | | | 156/763 |

(Continued)

FOREIGN PATENT DOCUMENTS

| CN | 202166800 U | 3/2012 |
| CN | 102621732 A | 8/2012 |
| CN | 104360507 A | 2/2015 |

(Continued)

*Primary Examiner* — Jermele M Hollington
*Assistant Examiner* — Suresh K Rajaputra
(74) *Attorney, Agent, or Firm* — Mark M. Friedman

(57) ABSTRACT

The present invention provides a clamper and a lighting fixture. An elastic layer for contacting a panel is disposed on a rotatable clamping portion. In addition to that, a distance from a lowest point of one end of the panel clamped by the rotatable clamping portion to a carrier plate supporting a polarizer at one side of the panel adjacent to a thin film transistor is greater than a thickness of the polarizer. Accordingly, the present invention prevents the panel and the polarizer at one side of the panel adjacent to the thin film transistor from being damaged from clamping.

9 Claims, 3 Drawing Sheets

(56) References Cited

U.S. PATENT DOCUMENTS

2015/0298444 A1* 10/2015 Yang .................. B23Q 3/088
    156/60
2017/0255037 A1* 9/2017 Ma .................... G01N 21/8803

FOREIGN PATENT DOCUMENTS

| CN | 106654065 A | 5/2017 |
|---|---|---|
| JP | 2002329773 A | 11/2002 |

* cited by examiner

CLAMPER AND LIGHTING FIXTURE

1. FIELD OF THE DISCLOSURE

The present invention relates to the field of a display device technique and in particular, to a clamper and a lighting fixture.

2. DESCRIPTION OF RELATED ART

When performing a lighting test on a liquid crystal panel in a case, a lighting fixture is used to fix the liquid crystal panel between an upper polarizer and a lower polarizer, and a backlight is provided at one side of the liquid crystal panel.

However, a conventional lighting fixture (see FIG. 1) is only suitable for a panel that is smaller than a polarizer attached to the panel. When the polarizer and the panel have a same size, or when the polarizer is larger than the panel, if the lighting fixture is used to fix glass of a thin-film-transistor (TFT) of the panel, the polarizer at one side of the panel adjacent to the TFT and the glass of the liquid crystal panel are easily damaged from clamping, and consequently decreases production yield.

In light of the above, there is a need to provide a solution to improve the production yields by preventing the polarizer at one side of the panel adjacent to the TFT and the glass of the liquid crystal panel from being damaged due to clamping.

SUMMARY

One objective of the present invention is to provide a clamper and a lighting fixture to solve the problem that a polarizer at one side of a display panel adjacent to a thin film transistor and glass of the display panel are damaged from clamping during a lighting test.

Accordingly, the present invention provides a clamper for clamping a substrate. The clamper comprises at least two rotatable clamping portions, an elastic layer for contacting the substrate is disposed on each of the at least two rotatable clamping portions, the substrate is any of a thin film transistor substrate, a color filter substrate, a polarizer, and a panel consisting of the thin film transistor substrate and the color filter substrate, and the elastic layer has a shore A hardness of 50-70.

In the clamper of the present invention, a protruding elastic structure is disposed on the elastic layer.

In the clamper, each of the rotatable clamping portions is a roller, the roller is fixedly connected to one end of a connection rod, the other end of the connection rod is connected to a rotating portion, and the roller is rotated by rotation of the rotating portion to clamp or move away from the substrate.

In the clamper of the present invention, each of the rotatable clamping portions is a clamping plate, one end of the clamping plate is a movably connected end which is movably connected to be rotatable, and one end of the clamping plate, opposite to the movably connected end, is for clamping or moving away from the substrate by rotation.

In the clamper of the present invention, each of the rotatable clamping portions is made of a piezoelectric material.

Accordingly, the present invention provides a clamper for clamping a substrate. The clamper comprises at least two rotatable clamping portions, and an elastic layer for contacting the substrate is disposed on each of the at least two rotatable clamping portions.

In the clamper of the present invention, a protruding elastic structure is disposed on the elastic layer.

In the clamper of the present invention, the protruding elastic structure has any of a serrate protruding shape, a hemispherical protruding shape or a cuboid strip pattern.

In the clamper of the present invention, the elastic layer has a thickness of 50 to 200 micrometers (μm).

In the clamper of the present invention, each of the rotatable clamping portions is a roller, the roller is fixedly connected to one end of a connection rod, the other end of the connection rod is connected to a rotating portion, and the roller is rotated by rotation of the rotating portion to clamp or move away from the substrate.

In the clamper of the present invention, each of the rotatable clamping portions is a clamping plate, one end of the clamping plate is a movably connected end which is movably connected to be rotatable, and one end of the clamping plate, opposite to the movably connected end, is for clamping or moving away from the substrate by rotation.

In the clamper of the present invention, each of the rotatable clamping portions is made of a piezoelectric material.

The present invention provides a lighting fixture, the lighting fixture comprising:

a carrier plate, the carrier plate is for supporting a polarizer at one side of a panel adjacent to a thin film transistor and supporting the panel disposed over the polarizer;

a clamper, the clamper comprising at least two rotatable clamping portions, each of the at least two rotatable clamping portions being used for clamping the panel, the elastic layer for contacting the panel being disposed on the rotatable clamping portion;

wherein a distance from a lowest point of one end of the panel clamped by the rotatable clamping portion to the carrier plate is greater than a thickness of the polarizer.

In the lighting fixture of the present invention, a protruding elastic structure is disposed on the elastic layer.

In the lighting fixture of the present invention, the protruding elastic structure has any of a serrate protruding shape, a hemispherical protruding shape or a cuboid strip pattern.

In the lighting fixture of the present invention, the elastic layer has a thickness of 50 to 200 micrometers (μm).

In the lighting fixture of the present invention, a surface of the polarizer facing the panel is larger or equal to a surface of the panel facing the polarizer.

In the lighting fixture of the present invention, each of the rotatable clamping portions is a roller, the roller is fixedly connected to one end of a connection rod, the other end of the connection rod is connected to a rotating portion, and the roller is rotated by rotation of the rotating portion to clamp or move away from the panel.

In the lighting fixture of the present invention, each of the rotatable clamping portions is a clamping plate, one end of the clamping plate is a movably connected end which is movably connected to be rotatable, and one end of the clamping plate, opposite to the movably connected end, is for clamping or moving away from the panel by rotation.

In the lighting fixture of the present invention, each of the rotatable clamping portions is made of a piezoelectric material.

The present invention has the following advantage. The elastic layer for contacting the substrate is disposed on the rotatable clamping portion to provide buffering, thus preventing the substrate from being damaged by the rotatable clamping portion while the rotatable clamping portion clamps the substrate.

Furthermore, during the lighting test, the elastic layer for contacting the panel is disposed on the rotatable clamping portion to prevent the panel from being damaged due to clamping. Besides, the distance from the lowest point of the rotatable clamping portion's one end clamping the panel to the carrier plate is greater than the thickness of the polarizer. This prevents the rotatable clamping portion from contacting the polarizer at one side of the panel adjacent to the TFT, thereby preventing the polarizer at one side of the panel adjacent to the TFT from being damaged due to clamping.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, a person having ordinary skill in this field can obtain other figures according to these figures without an inventive work or paying the premise.

DETAILED DESCRIPTION OF EMBODIMENTS

Embodiments of the present disclosure are described in detail with reference to the accompanying drawings as follows. Directional terms such as up/down, right/left and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention.

Figure 1:
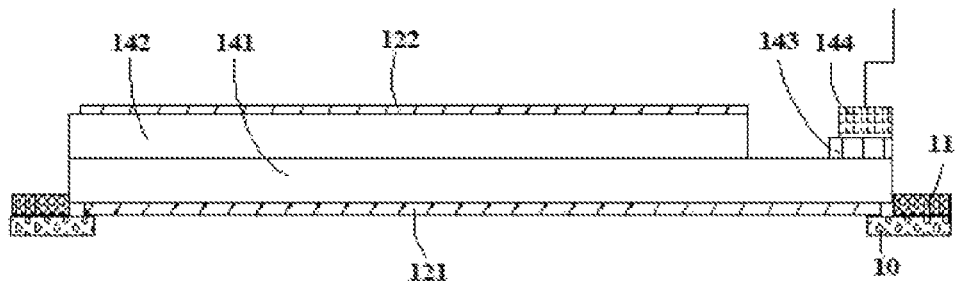
FIG. 1 is a lateral view showing a conventional lighting fixture.
Figure 2:
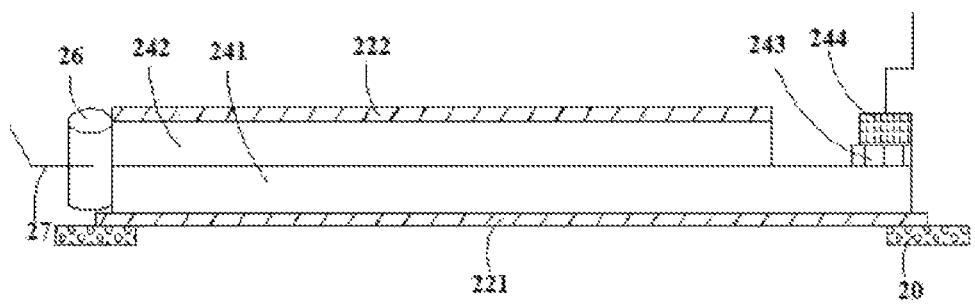
FIG. 2 is a lateral view showing a lighting fixture according to a first embodiment of the present invention, wherein a rotatable clamping portion of the lighting fixture clamps a panel.
Figure 3:
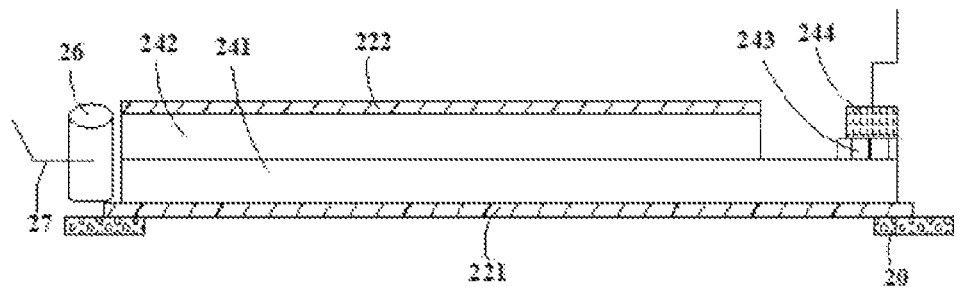
FIG. 3 is a lateral view of the first embodiment, showing that the rotatable clamping portion of the lighting fixture moves away from the panel.
Figure 4:
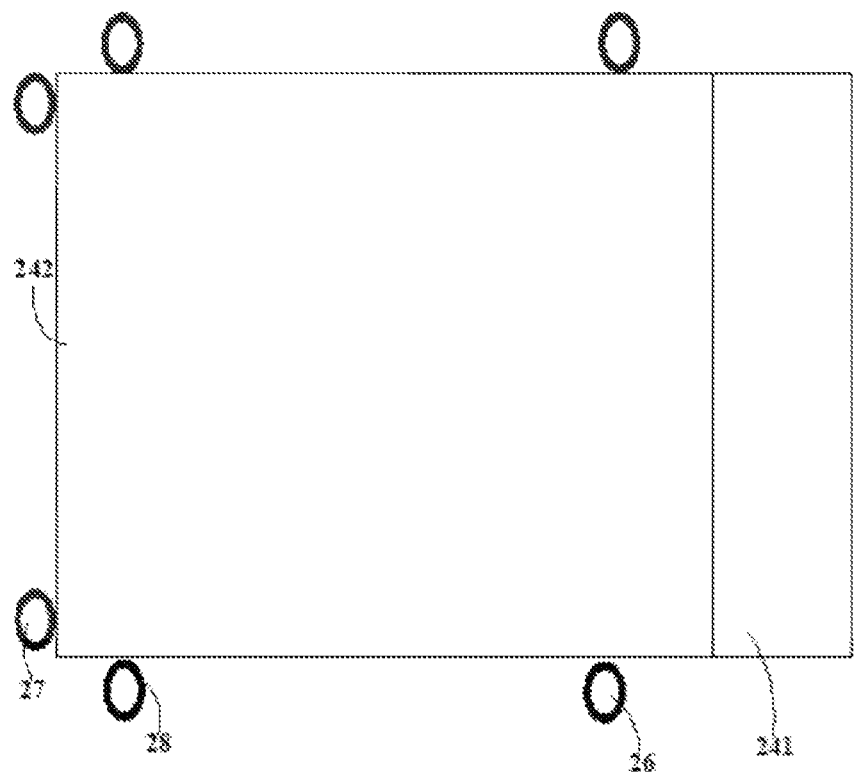
FIG. 4 is a top view of the first embodiment, showing that the rotatable clamping portion of the lighting fixture clamps the panel.

Please refer to FIGS. 2, 3 and 4, showing a lighting fixture of the present invention. The lighting fixture comprises:

a carrier plate 20, the carrier plate 20 is for supporting a first polarizer 221 at one side of a panel 24 adjacent to a thin film transistor and for supporting the panel 24 disposed over the first polarizer 221;

a clamper, the clamper comprising at least two rotatable clamping portions 26, each of the at least two rotatable clamping portions 26 being used for clamping the panel 24, the elastic layer 28 for contacting the panel 24 being disposed on the rotatable clamping portion 26;

wherein a distance from a lowest point of one end of the panel 24 clamped by the rotatable clamping portion 26 to the carrier plate 20 is greater than a thickness of the first polarizer 221.

In the present embodiment, the carrier plate 20 is a square structure made of a hard material to well support the panel 24 disposed over the polarizer 221. According to a light transmissive rate required by the carrier plate 20, the hard material can be a hard plastic material, a hard metal material or other suitable material.

According to the present embodiment, the panel 24 is constituted by a TFT substrate 241 and a color filter (CF) substrate attached to each other. An integrated circuit (IC) 243 is disposed on the TFT substrate 241, at one side where the CF substrate is not attached. A lighting test is performed by pressing a probe 244 onto a contact point of the IC 243. The TFT substrate 241 is disposed at one side of the panel 24 adjacent to the first polarizer 221. The CF substrate 242 is disposed at one side of the panel 24 away from the first polarizer 221. A lining layer of the TFT substrate 241 and a lining layer of the CF substrate 242 are both made of glass. The panel 24 is fixed by fixing the glass of the TFT substrate 241. In alternative embodiments, the panel can be other substrate, such as a TFT substrate, a CF substrate or a polarizer, in the field of display device techniques; however, the present invention is not limited in this regard.

In the present embodiment, the first polarizer 221 is constituted by a protection film, a tri-cellulose acetate (TCA) layer, a polyvinyl-alcohol layer, a TCA layer, a pressure sensitive adhesive layer, and a release film for protecting the pressure sensitive adhesive layer which sequentially overlap each other and are attached to each other by an adhesive. The polyvinyl-alcohol layer has light polarizing properties. A pressure sensitive adhesive is used to attach the first polarizer 221 to the glass of the TFT substrate 241. A surface of the first polarizer 221 facing the panel 24 is larger or equal to a surface of the panel 24 facing the first polarizer 221. The first polarizer 221 has a thickness of 220 to 300 micrometers (μm).

According to the present embodiment, each of the rotatable clamping portions 26 is a roller. The roller includes a curved surface and a top surface and a bottom surface surrounded by the curved surface. The top surface and the bottom surface are two circles of the same size. The roller is disposed over the carrier plate 20 and the curved surface of the roller is perpendicular to a horizontal plane where the carrier plate 20 is arranged. The bottom surface of the roller is disposed adjacent to the carrier plate 20 and is horizontal to the horizontal plane where the carrier plate 20 is arranged. In alternative embodiments, the roller can be disposed over the carrier plate 20 in different ways; for example, the top surface and the bottom surface of the roller is perpendicular to the horizontal plane where the carrier plate 20 is arranged, which means that the roller is rotated by an angle of 90 degrees and is arranged over the carrier plate 20. The roller is fixedly connected to one end of a connection rod 27, the other end of the connection rod 27 is connected to a rotating portion (not illustrated), and the roller is rotated by rotation of the rotating portion to clamp the panel 24 from one side or move away from the panel 24. The present embodiment is not limited to a particular type of rotating portion; the rotating portion can be, for example, a rotating axle arranged parallel to a central axis of the roller.

During the lighting test, the roller is rotated to clamp the glass of the TFT substrate 241 so as to fix the panel 24 (as shown in FIG. 2). After the lighting test, the roller is rotated to move away from the panel 24 (see FIG. 3). That is to say, the roller moves horizontally with respect to the panel 24 so as to clamp or move away from the panel 24. This means that, only when there is a need to carry out the lighting test, the roller clamps the glass of the TFT substrate 241. Compared to conventional techniques in which the glass of the TFT substrate 241 is always clamped, the present invention utilizes the rotatable roller to reduce the risk of damage to the glass of the TFT substrate 241 due to clamping.

According to the present embodiment, a distance from the bottom surface of the roller to the carrier plate 20 is greater than a thickness of the first polarizer 221, so that the first polarizer 221 is prevented from being contacted by the roller, thus preventing damage to the first polarizer 221.

In order to fix the panel 24 by the rotatable clamping portions 26, the rollers need to clamp at least two opposite sides of the panel 24. When the rollers are used to clamp the panel 24, the rollers at least two opposite sides of the panel 24 are arranged corresponding to each other to ensure that the rollers apply force evenly to the panel 24, thereby preventing shifting/slipping of the panel 24. As shown in FIG. 4, when the rollers clamp the panel 24, the rollers are disposed on two opposite long sides and one short side of the panel 24. There are two rollers on one of the two opposite long sides, and the other long side also has two rollers arranged thereon corresponding to each other. By having two pairs of rollers arranged opposite to each other on the two opposite long sides, the panel 24 can be fixed well. On the short side of the panel 24, there are two rollers arranged symmetrically to each other.

Figure 5:
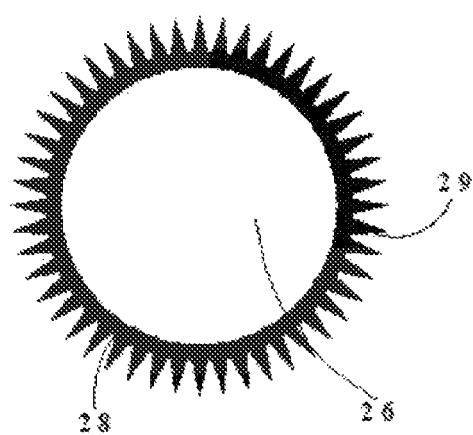
FIG. 5 is a partially enlarged view showing the rotatable clamping portion of the lighting fixture according to the first embodiment of the present invention.

As shown in FIG. 5, an elastic layer 28 for contacting the glass of the TFT substrate 241 is disposed on the entire curved surface of the roller. The elastic layer 28 has a shore A hardness of 50-70. The elastic layer 28 of the aforesaid hardness prevents the glass of the TFT substrate 241 from being damaged from clamping, and also prevents shifting of the TFT substrate 241 due to insufficient hardness. The elastic layer 28 is made of rubber such as polyurethane. The elastic layer 28 has a thickness of 50 to 200 micrometers (μm). If the elastic layer 28 is too thin, it cannot provide buffering. If the elastic layer 28 is too thick, it will cause a portion of the panel 24 clamped by the roller to sink into the elastic layer and affect the lighting test. The elastic layer 28 is, for example, attached to or coated onto the surface of the roller. When the roller clamps the glass of the TFT substrate 241, the elastic layer 28 disposed on the roller provides buffering, and the soft elastic layer 28 does not clamp too hard the glass of the TFT substrate 241, thus preventing damage to the glass of the TFT substrate 241.

Furthermore, a protruding elastic structure 29 is disposed on the elastic layer 28. The protruding elastic structure 29 is of a serrate protruding shape, a hemispherical protruding shape or a pattern such as a cuboid strip pattern which can increase friction between the elastic layer 28 and the glass. The protruding elastic structure 29 and the elastic layer 28 are made of the same material or different materials. If the protruding elastic structure 29 and the elastic layer 28 are made of the same material, the protruding elastic structure 29 and the elastic layer 28 can be made by the same manufacturing step. If the protruding elastic structure 29 and the elastic layer 28 are made of different materials, the protruding elastic structure 29 and the elastic layer 28 can be made by separate manufacturing steps. The protruding elastic structure 29 increases roughness of the elastic layer 28 to thereby increase friction between the elastic layer and the glass of the TFT substrate 241, thus preventing slipping/shifting between the elastic layer 28 and the glass.

Furthermore, the roller is made of a piezoelectric material. When the roller clamps the panel, the two rollers disposed opposite to each other form a capacitance structure. The rollers pressed by the panel deform, so the capacitance between the two rollers opposite to each other changes. Therefore, the force applied to the roller can be transformed into capacitance signals. Through the capacitance signals sent out, a clamping force which clamps the panel can be controlled to prevent the panel from being damaged due to a too large clamping force. This technique cooperating with other techniques can calculate panel sizes and can check, keep and upload record numbers related to the panel sizes, so that the panel sizes and parameters can be inquired, and an alert can be sent when the sizes/parameters are too large.

Figure 6:
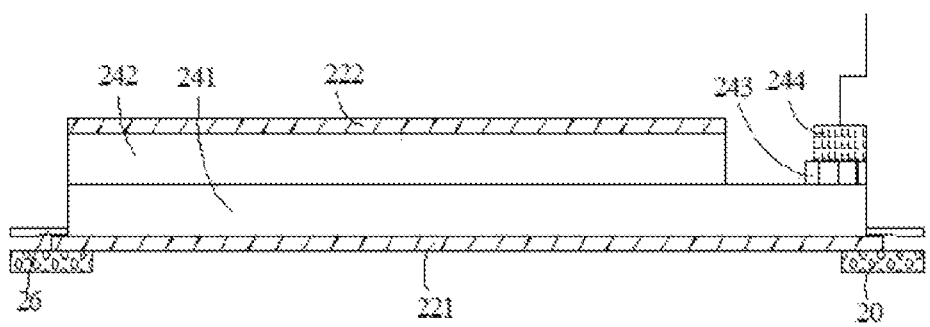
FIG. 6 is a lateral view showing a lighting fixture according to a second embodiment of the present invention, wherein a rotatable clamping portion of the lighting fixture clamps a panel.
Figure 7:
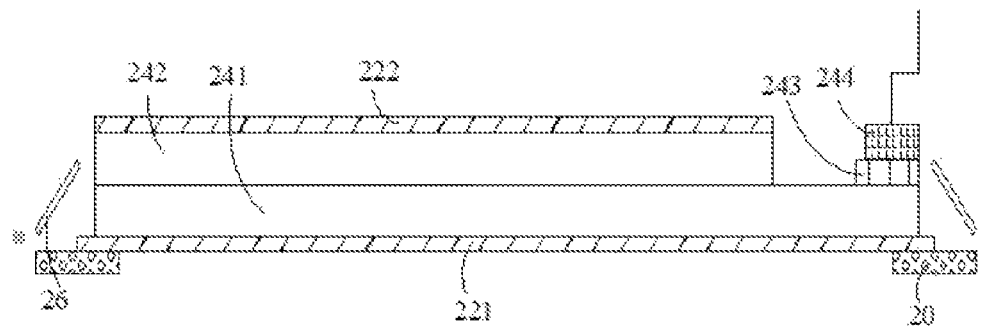
FIG. 7 is a lateral view of the second embodiment, showing that the rotatable clamping portion of the lighting fixture moves away from the panel.
Figure 8:
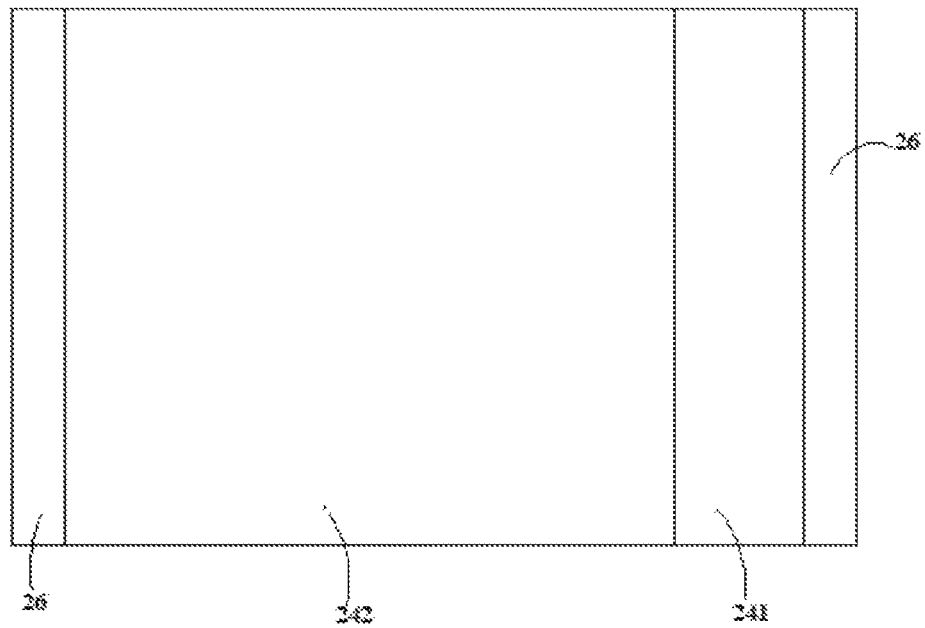
FIG. 8 is a top view of the second embodiment, showing that the rotatable clamping portion of the lighting fixture clamps the panel.

Please refer to FIGS. 6 to 8 showing a lighting fixture according to the second embodiment of the present invention, wherein FIGS. 6 and 7 are lateral views of the lighting fixture, and FIG. 8 is a top view of the lighting fixture according to the second embodiment of the present invention. The lighting fixture of the second embodiment is similar to the lighting fixture of the first embodiment, but is different in that the rotatable clamping portion 26 of the second embodiment is a clamping plate. The clamping plate can be a thin sheet, a rectangular plate or of other shape. One end of the clamping plate is a movably connected end which is movably connected to be rotatable. When the clamping plate is the thin sheet, the clamping plate is in linear contact with the panel 24. When the clamping plate is the rectangular plate, the clamping plate is in surface contact with the panel 24. Compared to linear contact, the surface contact between the rectangular plate and the panel 24 results in a larger contact surface to ensure that the panel 24 can be fastened well. The movably connected end is movable by using a screw rod and a nut or using a hinge; however, the present invention is not limited in this regard. According to the present embodiment, the clamping plate is rotated up and down with respect to the panel 24 to clamp or move away from the panel 24.

During the lighting test, the clamping plate clamps the glass of the TFT substrate 241 (see FIG. 6) of the panel 24. An elastic layer and a protruding elastic structure for contacting the panel 24 are disposed on a surface of the clamping plate, so that the clamping plate can fix the panel 24 without damaging the glass of the panel 24. It will be appreciated that, other surface of the clamping plate can also have the elastic layer and the protruding elastic structure according to requirement. When the clamping plate clamps the panel 24, the clamping plate is parallel to a horizontal plane where the carrier plate 20 is arranged. A distance from a lowest point of a lower surface of the clamping plate to the carrier plate 20 is greater than the thickness of the first polarizer 221, thus preventing the clamping plate from contacting the first polarizer 221, thereby preventing the first polarizer 221 from being damaged from clamping. After the lighting test, the clamping plate is rotated to move away from the panel 24 (see FIG. 7).

In order to fix the panel 24 by using the clamping plates, the clamping plates at least need to fix two opposite sides of the panel 24 when the clamping plate clamps the panel 24. The clamping plates at two opposite sides are arranged corresponding to each other to ensure that the panel 24 is evenly pressed, thereby preventing shifting/slipping of the panel 24. As shown in FIG. 8, the two clamping plates clamp a short side of the TFT substrate 241 adjacent to the integrated circuit and also clamp the other short side of the TFT substrate 241 opposite to the short side adjacent to the integrated IC. The number of the clamping plates disposed on the short sides may vary according to the size of the clamping plate; the present invention is not limited to any particular number of the clamping plates.

It should be noted that, when to perform the lighting test, a second polarizer 222 (a polarizer at one side of the panel 24 adjacent to the CF substrate) is disposed on the panel 24 according to the first embodiment and the second embodiment. The second polarizer 222 has the same composition and thickness as the first polarizer 221 has. A polarization direction of the first polarizer 221 is perpendicular to a polarization direction of the second polarizer 222. In order to prevent the rotatable clamping portion 26 from damaging the second polarizer 222 when clamping the panel 24, it is required to adjust a highest point of one end of the panel 24, clamped by the rotatable clamping portion 26, to be lower than a plane where a top portion of the CF substrate 242 is. To be specific, a height of the roller is less than a thickness of the panel 24 in the first embodiment while a thickness of the clamping plate is less than the thickness of the panel 24 in the second embodiment.

In summary, in the lighting fixture of the present invention, the elastic layer for contacting the panel is disposed on the rotatable clamping portion to prevent the panel from being damaged from clamping. The distance from the lowest point of one end of the panel clamped by the rotatable clamping portion to the carrier plate is greater than the thickness of the polarizer. Accordingly, the present invention prevents the rotatable clamping portion from contacting the polarizer adjacent to the thin film transistor substrate, thereby preventing the polarizer adjacent to the thin film transistor substrate from being damaged from clamping.

It is to be understood that the above descriptions are merely the preferable embodiments of the present invention and are not intended to limit the scope of the present invention. Equivalent changes and modifications such as structural changes or process modifications made in the spirit of the present invention are regarded as falling within the scope of the present invention.

What is claimed is:

1. A lighting test system, comprising:
    a panel comprising a thin film transistor substrate and a color filter (CF) substrate disposed on the thin film transistor substrate, a polarizer is disposed at one side of the panel adjacent to the thin film transistor substrate, and the panel is disposed on the polarizer;
    a probe attachable to an integrated circuit (IC) for performing a lighting test on the panel;
    a carrier plate for supporting the polarizer; and
    a clamper comprising at least two rotatable clamping portions, wherein each of the at least two rotatable clamping portions is for clamping the panel, and an elastic layer for contacting the panel is disposed on each of the at least two rotatable clamping portions;
    wherein a distance from a carrier plate to a lowest point of one end of each of the rotatable clamping portions clamping the panel is greater than a thickness of the polarizer.

2. The lighting test system according to claim 1, wherein a protruding elastic structure is disposed on the elastic layer.

3. The lighting test system according to claim 2, wherein the protruding elastic structure has any one of a senate protruding shape, a hemispherical protruding shape, or a cuboid strip pattern.

4. The lighting test system according to claim 1, wherein the elastic layer has a thickness of 50 to 200 micrometers ($\mu$m).

5. The lighting test system according to claim 1, wherein a surface of the polarizer opposite to the panel is larger or equal to a surface of the panel opposite to the polarizer.

6. The lighting test system according to claim 1, wherein each of the at least two rotatable clamping portions is a roller, the roller is fixedly connected to one end of a connection rod, the other end of the connection rod is connected to a rotating portion, and the roller is rotated by rotation of the rotating portion to clamp or move away from the panel.

7. The lighting test system according to claim 1, wherein each of the at least two rotatable clamping portions is a clamping plate, one end of the clamping plate is a movably connected end which is movably connected to be rotatable, and one end of the clamping plate, opposite to the movably connected end, is for clamping or moving away from the panel by rotation.

8. The lighting test system according to claim 1, wherein each of the at least two rotatable clamping portions is made of a piezoelectric material.

9. The lighting test system according to claim 2, wherein the elastic layer has a shore A hardness of 50-70.

\* \* \* \* \*